United States Patent Office 3,398,714
Patented Aug. 27, 1968

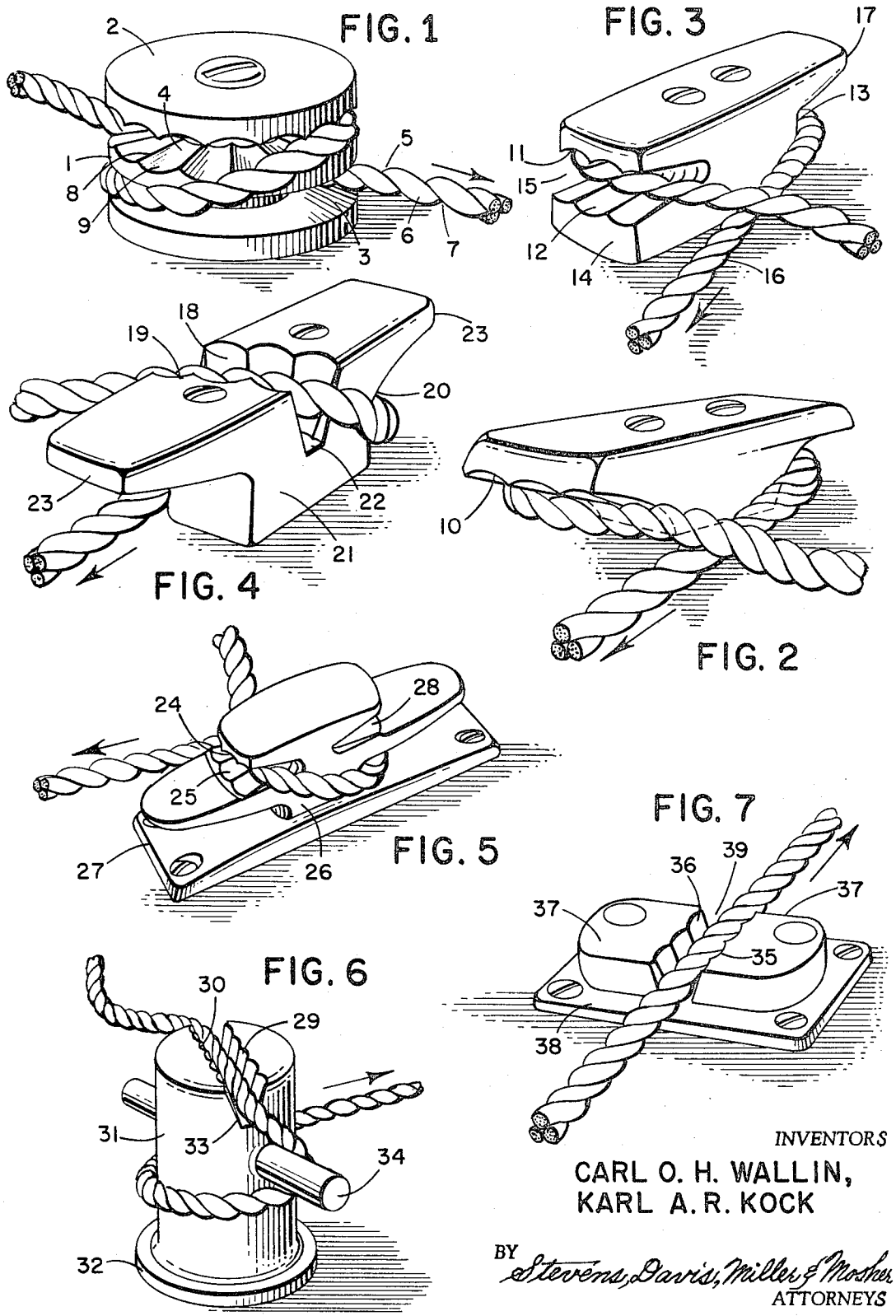

3,398,714
SECURING MEANS FOR ROPES, HAWSERS AND THE LIKE
Carl Olov Harry Wallin, Bergliden 20, Ektorp, Sweden, and Karl Axel Rune Kock, Ravstigen 1, Saltsjo-Duvnas, Sweden
Filed Feb. 7, 1966, Ser. No. 525,700
Claims priority, application Sweden, Feb. 9, 1965, 1,638/65
12 Claims. (Cl. 114—218)

ABSTRACT OF THE DISCLOSURE

An improved securing means for ropes, hawsers, and the like formed of twisted cords, which locks the rope without relying on frictional forces. The means comprises engaging surfaces having pronounced V-shaped waves so arranged that the crests of the waves on one engaging surface are approximately opposite the center of the troughs of the waves on the opposing engaging surface so that when a rope is secured therebetween the crests and troughs of the opposing surfaces engage the contours of the rope locking it in a substantially frictionless manner. The design of the wave-like surfaces is such that the distance between the opposing crests and troughs increases from the center of the means towards the periphery thereof, thus allowing ropes of various dimensions to be secured by the invention.

Securing means for ropes and hawsers known hitherto are based on the principle that frictional forces take up the tensions in the rope. To increase such frictional forces securing devices have been provided with ridges or teeth which, because they have not been adapted to the contours of the rope, cause the load to be concentrated at a point on, or along a portion of the same, resulting in considerable wear, tear and deformation on said rope.

The present invention is based on a securing device, or portion thereof, provided with wave-forming ridges which accommodate the surface contours of the rope in a plane through the longitudinal axis of the same, and which is distinguished from other hitherto known securing devices by the fact that the retaining force is not obtained by friction but by direct contour engagement as with a nut and bolt where the threads of one conform and mesh with the threads of the other, in contra-distinction to a nail which depends on friction in fulfilling its function.

In a securing device according to the inventive idea the twisted cords and the channels formed between these cords—seen in the plane of the longitudinal axis of the rope—mesh with the troughs and crests of the wave-like ridges provided for this purpose in said securing device, a positive and completely slip-free engagement between corresponding meshing surfaces being obtained without damage to separate cords or to the rope as a whole. This is of particular importance with respect to present day manufacture where the artificial fibers from which such ropes are made are very susceptible to wear and damage easily, and which, partly due to the low coefficient of friction present by their smooth, shiny surfaces, require high clamping forces causing local stress concentrations.

The wave-troughs and crests of the securing device engage the rope, mutually at right angles to the longitudinal axis of said rope, from two sides in such a way that the rope lying between them rests in a long or a short groove, the walls of which are constituted of continuous waves having a pitch conforming to different sized ropes.

The rope is held securely in the groove by reason of the fact that the walls of said groove slope to form a V so that the center angle of the groove is less than the friction angle of the walls of the groove. Thus, the frictional force is utiilzed here at right angles to the longitudinal direction of the rope whereas the wave crests prevent the rope from sliding in the load direction of the same.

The length of the groove and consequently the effective engagement surface, can be varied with different applications of use.

Should a large engagement surface be required such a surface can also be wave-shaped and may suitably include a closed annular groove or a portion of such a groove. In this way a continuous reduction towards the bottom of the groove of the distance between the wave-crests is also obtained which means that ropes differing very widely in diameter are accommodated by corresponding depths of said groove.

Simple securing devices such as cleats and bollards can also be designed with a single-side engagement surface, the flat surface, reaction surface, suitably constituting the plane on which the securing device is mounted.

In all embodiments of the engagement groove, which may also deviate in appearance from a symmetrical V-shape, a radial clamping force is obtained on the rope which is sufficient to retain the rope but not so great that the rope cannot be removed from the groove by applying a small force when it is necessary to release the rope.

Securing of the rope can, according to the idea of the invention, be varied in many ways, e.g. on securing devices of the type which securely clamp the rope between movable jaws by means of eccentrics or other lever-arm actions. The jaws on such a device are suitably designed with wave-shaped surfaces inclined towards each other for the varying size of the rope.

The securing device according to the idea of the invention provided with the engagement surface designed as a continuous or approximately continuous groove, can also be mounted on an axle caused to rotate thereby and used as a wheel in a pulley system.

The accompanying drawing illustrates various examples of different securing devices all provided with engagement surfaces according to the invention.

FIGURE 1 shows a round bollard type securing device.

FIGURE 2 shows a simple clamping cleat, the mounting plane of which serves as the reaction surface for the rope in the wedge-shaped cavity provided with engagement surfaces according to the invention.

FIGURE 3 shows a clamping cleat with the active groove located in one of the ends of the cleat.

FIGURE 4 shows type of cleat of which a top groove is provided with engagement surfaces according to the invention.

FIGURE 5 shows a bollard type securing device provided with two diametrically opposed engagement surfaces according to the invention.

FIGURE 6 shows two projections, at right angles to each other of a type of bollard provided with engagement surfaces for rope positioned on top of said bollard.

FIGURE 7 shows a type of cleat having two eccentric movable jaws provided with engagement surfaces according to the invention.

In FIGURE 1 the reference numerals 1 and 2 indicate circular discs provided with engagement surfaces around the center. The numeral 3 indicates a surface on which a rope is hauled, 4 indicates the wedge-shaped groove between the engagement surfaces, 5 a rope-end, 6 a cord of the rope, 7 the triangular space presented between two cords. Reference numeral 8 shows a wave-crest and 9 a wave-trough accommodating the triangular space of the respective cords.

In FIGURE 2 the numeral 10 indicates an engagement surface with the mounting plane as the reaction surface.

The reference numerals 11 and 12 respective, in FIGure 3, show the upper and lower engagement surfaces respectively according to the invention positioned on one side of the cleat. The reference numeral 13 indicates a slide-surface on which a rope is hauled, 14 a base plate and 15 the wedge-shaped groove between the engagement surfaces in which a rope 16 is indicated by means of dot-dash lines. The numeral 17 indicates an extended guide edge for the rope.

In FIGURE 4 the engagement surfaces are indicated by numerals 18 and 19, the hauling-surface with 20, 21 the base of the securing device against a deck, mast or the like, the wedge-shaped groove between the engagement surfaces with 22 whilst extended guide edges for the rope are indicated by the reference numeral 23.

In FIGURE 5 reference numerals 24 and 25 respectively, indicate the upper and lower of two opposing engagement surfaces. Reference 26 shows a neck-shaped intermediate portion having curved sliding surfaces for the rope. Reference numeral 27 shows the base plate of the securing means and 28 the wedge-shaped groove between the engagement surfaces.

In FIGURE 6 the reference numerals 29 and 30 indicate two engagement surfaces, 31 the surface over which the rope is hauled, 32 the deck of a ship, 33 the wedge-shaped groove, 34 a rod which prevents the rope from sliding too far up towards the groove.

In FIGURE 7 the reference numerals 35 and 36 indicate the engagement surfaces on two eccentrically mounted jaws 37. The numeral 38 indicates the base-plate and 39 the wedge-shaped groove, which groove may possibly have parallel sides, and 40 indicates a rope inserted in said groove. Due to the wedge-shape design of the engagement surfaces, or alternatively the movable jaws shown in FIGURE 7, ropes which vary greatly in size can be used in each type of securing device.

The invention is not limited to the embodiments described and shown but can be varied within the scope of the attached claims.

What is claimed is:
1. A securing means for ropes, hawsers, and the like formed from a plurality of cords twisted together comprising at least one pair of opposing rope engaging surfaces, said surfaces having a continuous wave-shaped profile formed of a series of substantially pointed crests with substantially arcuate troughs therebetween, said crests engaging with said ropes in the space between cords and said troughs accommodating said cords, the pitch of said waves at the outer ends of said opposing surfaces being greater than the pitch at the inner ends thereof.

2. A securing means according to claim 1 wherein said troughs and crests are mutually displaced between said rope engaging surfaces so that the crests on one surface are positioned substantially opposite the troughs on the other surface.

3. A securing means according to claim 1 in which said opposing rope engaging surfaces form an open substantially V-shaped groove tapering towards the bottom.

4. A securing means according to claim 3 in which the angle between said surfaces is less than that required for frictional engagement between the rope and the surface of said groove.

5. A securing means according to claim 3 in which said groove is annular, the pitch between the wave crests accommodating ropes of varying dimensions.

6. A securing means according to claim 1 wherein said securing means is a clamping cleat having a wedge-shaped cavity formed therein to provide said engaging surfaces, said rope being secured between said surfaces.

7. A securing means according to claim 6 in which said groove is formed in an end portion of said cleat.

8. A securing means according to claim 6 in which said groove is formed across a top portion of said cleat.

9. A securing means according to claim 8 in which a projection is provided extending at right angles to said groove.

10. A securing means according to claim 1 wherein said securing means is a round bollard-type securing means.

11. A securing means according to claim 1 wherein said securing means is a bollard type provided with two diametrically opposed engagement surfaces.

12. A securing device according to claim 1 wherein said means comprises a cleat having two eccentric pivotal jaws, engagement surfaces being provided on the adjacent surfaces of said jaws.

References Cited
UNITED STATES PATENTS

| | | | |
|---|---|---|---|
| 83,075 | 10/1863 | McMaster | 24—115 |
| 587,806 | 8/1897 | Fox | 24—115 |
| 655,155 | 7/1900 | Littlepage | 24—115 |

FOREIGN PATENTS 1,377,316  9/1964  France.

MILTON BUCHLER, *Primary Examiner.*
T. W. BUCKMAN, *Assistant Examiner.*